United States Patent [19]

Martyr

[11] Patent Number: 4,634,832
[45] Date of Patent: Jan. 6, 1987

[54] LASER-BEAMWELDING

[75] Inventor: David R. Martyr, Newcastle upon Tyne, England

[73] Assignee: British Shipbuilders, Newcastle upon Tyne, England

[21] Appl. No.: 601,424

[22] Filed: Apr. 18, 1984

[30] Foreign Application Priority Data

Apr. 20, 1983 [GB] United Kingdom ................. 8310630
Apr. 20, 1983 [GB] United Kingdom ................. 8310631
Apr. 20, 1983 [GB] United Kingdom ................. 8310632

[51] Int. Cl.$^4$ ............................................. B23K 26/00
[52] U.S. Cl. ...................... 219/121 LC; 219/121 LD; 219/121 LQ; 219/121 LV; 219/121 FS
[58] Field of Search ..... 219/121 L, 121 LM, 121 LC, 219/121 LD, 121 FS, 121 LQ, 121 LV

[56] References Cited

U.S. PATENT DOCUMENTS 3,860,784  1/1975  Brown et al. ................ 219/121 LD
4,128,753 12/1978  Sharp ......................... 219/121 FS X
4,223,201  9/1980  Peters et al. ................. 219/121 LC
4,546,230 10/1985  Sasaki et al. ................. 219/121 LD

FOREIGN PATENT DOCUMENTS 92766  8/1976  Japan ........................... 219/121 LD
51097  4/1979  Japan ........................... 219/121 LD
187894 11/1966  U.S.S.R. ........................ 219/121 L Primary Examiner—C. L. Albritton
Attorney, Agent, or Firm—Robert C. Podwil

[57] ABSTRACT

Contiguous metal plates are welded together without special edge preparation or bevelling e.g. of cut edges 13 from one side using a focussed high intensity laser beam 7. To ensure maintenance of welding conditions even when the plate edges are spaced apart by cutting imperfections or the like a wire 12 is fed to, or near, the beam focus 10 to intercept the beam and give rise to a plasma. This plasma is kept in place by gas supply means 8, the gas supply through ducting 15, 16 of which (a) prevents plasma building up above the weld zone (which would decrease the beam intensity at the weld) but (b) holds some plasma in the region of the beam impingement on the wire so as to allow energy transfer to the adjacent walls.

Butt welds or T welds can be made in this way, even in plate material, in a single pass from one side. The technique thus permits the arrangement of work stations on a production line to be simplified and rationalized when making up multiweld repeat structural units e.g. in shipbuilding.

10 Claims, 17 Drawing Figures

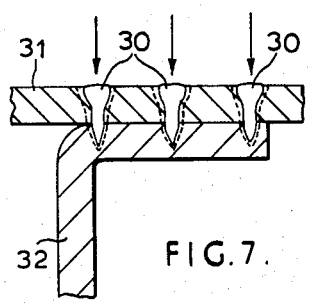
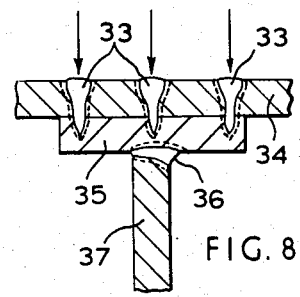
FIG. 7.  FIG. 8.
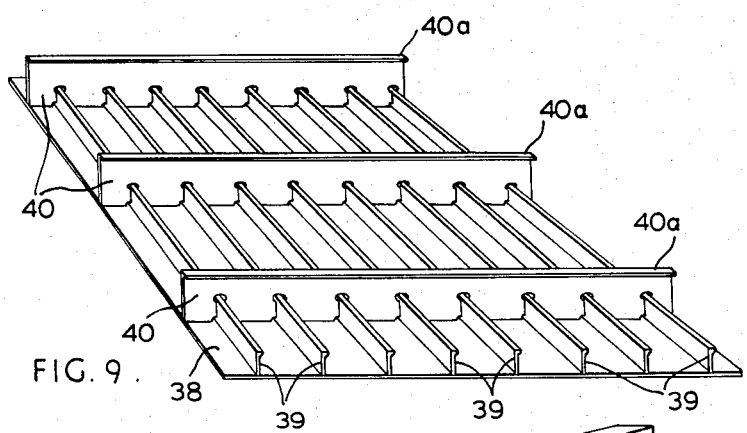
FIG. 9.
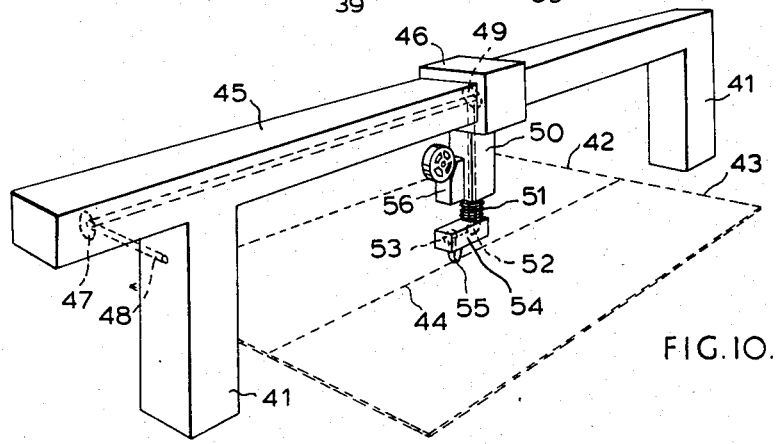
FIG. 10.

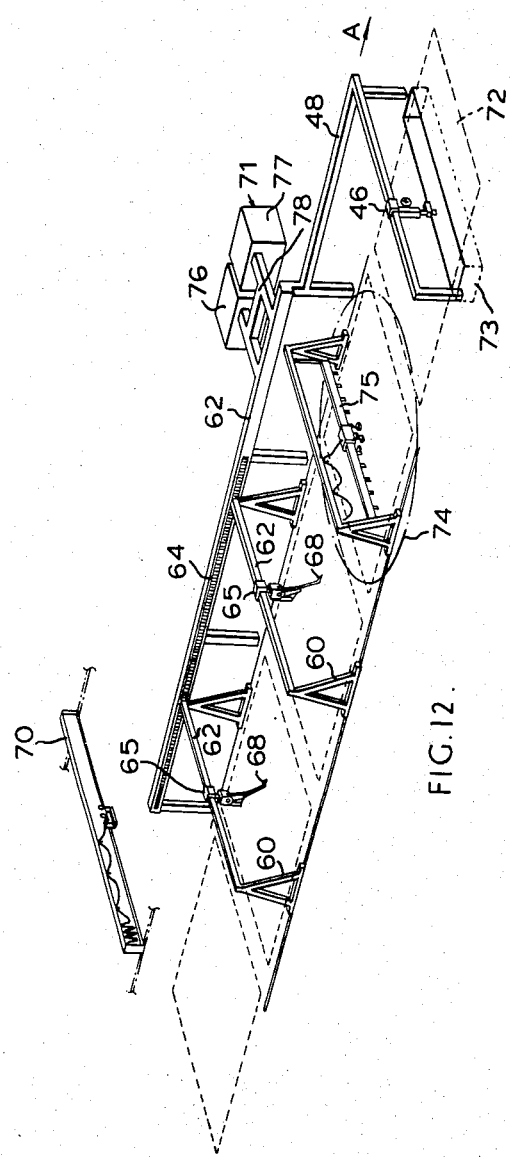

LASER-BEAMWELDING

This invention relates to welding, more especially to welding of metal, usually but not invariably ferrous metal, in the form of plate or structural members. The invention further relates to improvements of shop layout and practice having their origin in such welding techniques.

The welding of abutting edges of steel plate, or "butt" welding, typically takes place by moving a welding arc along the adjacent upper edges of the plate to melt and fuse the material. Since, however, the depth (penetration) of the molten zone is limited, it is necessary with heavier-gauge plate also to weld the other face of the joined plates. This must be done either by picking up the partly-joined plates and turning them over prior to a second run (which can cause damage, and may need an expensive crane installation) or by carrying out a second run from beneath the plates, which is slower and more dangerous to the welder. With the thickest grades of plates, the combined penetration in still inadequate, and it is therefore additionally necessary, in a preliminary step, to bevel the plate edges at top and bottom and carry out the welds using a filler material in the V-shaped channels thus formed.

Another common welding requirement is to weld one plate to another at, or almost at, a right angle configuration i.e. as "T" weld. Typically this is effected by creating a weld "fillet" along eacn internal corner, this once again necessitating two runs. The need to angle or bevel the attached plate corners also arises if heavy gauge plate is used. Similar techniques are used for the attachment of roll-formed or fabricated sections to a plate.

Laser beams are known expedients for cutting a variety of materials. The use of laser cutting has been proposed for thinner-gauge plate or sheet, since it produces a clean cut with the minimum of thermal distortion to the sheet.

The potential deep penetration of high-powered laser beams has led them to be considered as a source of energy in welding processes. However, preliminary results of laser welding for thicker-gauge ferrous material have not been encouraging; in particular it has been found necessary first to cut in the absence of oxygen the edges to be welded and secondly to clean up these edges and machine them so that they fit in closely abutting contact along their whole length. Only under such laboratory circumstances can welding be achieved.

In shipbuilding practice, or analogous shop practices in heavy engineering and construction, laboratory conditions are not achieved and laser welding experiments have proved unsuccessful. The reasons for this appear to reside in the state of the edges of the plate. Firstly, the cut edge may be slightly arcuate rather than straight, secondly, the cut is typically a slightly oxidised surface with rough ribs or striations at right angles to the plate surfaces due to turbulence in the cutting gas when the plate is initially cut to size by oxygen-fuel or laser-gas. Both of these reasons cause gaps, which can be up to 1 to 2 mm wide and be random or systematic, to appear between the abutted plates. To transfer sufficient energy to melt a weld pool of molten material, even a very energetic laser beam must be focussed very finely (below 1 mm e./g. 0.5 mm) and gaps of the sizes found in practice provide areas in which the focussed part of the beam does not contact the metal or only does so above or below the focus and therefore does not initiate melting.

We have now discovered a method for the laser welding of metal plate, especially ferrous plate, which does not involve extensive preparation of contacting plate portions beforehand and which surprisingly allows welding operations to be effected from one side of the plate only, taking full advantage of the deep penetration characteristics of the laser beam and thereby lending itself to ready use in shipbuilding and like shop conditions.

In one aspect the invention consists in a method for the welding together of portions of metal plate in which the cut or shaped portions to be welded are located in as close contact as their surfaces permit: characterised in that a focussed high-energy laser beam is caused to travel alone the said line of best contact; a separate compatible beam-interceptor material is located generally at the beam focus; and a supply of gas is directed towards the beam focus to at least partially confine a plasma at least partially formed by impingement of the focussed beam upon the interceptor material.

The surfaces of the portions to be welded need not be specially prepared, beyond normal cutting or rolling but of course the invention still operates if they are.

Usually, the plate and the beam-interceptor material are both ferrous metal. As applied to ferrous metal the term "plate" is generally understood to signify at least 3 mm thickness. A "compatible" metal may be identical in composition to that of the plates, but is often slightly different alloy of the same general nature.

In the operation of the above method a plasma is formed at least from the interceptor material, i.e. whether or not any portion of the plate also intercepts the focussed beam. The gas supply holds this plasma in place, at least to an extent whereby it can interact with the laser beam enough to cause energy transfer to the faces of the plate on either side of the gap and thereby melt these faces, but not so much as to intercept the beam above the level of the weld. The actual gas supply pattern can be adjusted by the operator having regard to the size of the weld pool and the width of the beam. In practice, unmachined, thermally-cut or laser-cut plate edges from 3 mm up to 25 mm in thickness can be welded throughout their depth in one pass by such a laser technique. Of course, if desired, such welding could be repeated at the underside, and the laser technique lends itself to vertical or horizontal welds, either "downhand" or possible even "uphand".

The beam interceptor material could in theory be a powder or fine-grained material dusted into the gap and held in place by a weld backing strip. This is not, however, preferred, and feed of material during welding is more preferable so that the amount needed can be controlled. One way of doing this is to pass granular material into the focus zone but it is more convenient to pass a supply of wire into that zone to intercept the beam. Usually the wire is fed from ahead of the weld, though the converse is also possible.

A distinction may be drawn between the incorporation of a weld filler wire and the beam-interceptor wire. Weld filler wires are conventional, and used to supplement the bulk of, or affect the composition of, a weld. They are placed into the weld line at the point of welding, but energy transfer takes place from the source to the weld faces and the wire unselectively, whereby both are melted. In the present invention, use of a filler wire per se is not adequate; any wire used must be accurately located in relation to the focus whereby, if a gap occurs, vapourization of the wire and formation of a plasma still takes place with the joint, allowing a transfer of energy to the components to be joined.

The method of the invention can readily be used for "butt", welding as described above. it moreover lends itself to the formation of welds, again from one side and in one pass if desired between the "stem" and "head" of a "T" weld. In practice, the axis of the laser beam will enter one side of the desired weld line at an angle up to 20°, more usually from 5° to 15°, and the beam will be focussed on an interceptor member at or just inside the outer faces of the plates to be joined. Similarly, a T-like weld, in which the stem has a rolled margin rather than a cut edge, can be made in such a fashion.

The use of too large an angle usually means that both internal corners have to be welded; this is quite acceptable but of course loses the particular single-pass advantage of the invention.

In another aspect the present invention provides an arrangement of work stations for use in the assembly by welding of metal plate, such as ferrous steel plate; characterised in that at least two such stations are provided at separate locations within a work-flow sequence, each station comprising a movable laser beam-focussing head selectively optically connectable into an optical path of a high-intensity laser beam generator common to the said two or more such work-stations, at least one of the work-stations being a welding station utilising a welding procedure as described above.

At least one of the work stations may be a laser-cutting station, e.g. for initial cutting and trimming. Laser cutting is a well known technique for a variety of materials. It has been used, with advantage, in the cutting of thin ferrous metal sheet, to reduce the distortion caused by thermal cutting.

Typically, up to five welding stations may be used; more are theoretically possible, but in practice (since, in use, any one station stops the use of others) this number is a preferred maximum.

The selective optical connection into the generated beam is achieved by "moving optics". Heavy gauge steel plate cannot convenient be moved so that an abutment (weld) line passes a stationary focussed laser beam. Similarly, high-energy generators of such a beam e.g. 5-25 KW lasers, are heavy and expensive and also cannot be moved along a weld line. Accordingly, a typical arrangement in the present invention comprises (a) a high intensity laser beam generator to provide an unfocussed coherent beam, (b) two or more angled laser beam mirrors provided at two or more locations, at each of which a mirror may be selectively interposed into the path of the beam and (c) an equal number of movable focussing heads, each focussing head including a further angled laser beam mirror and a focussing means to focus the beam to a small cross-section: whereby selective interposition of an angled mirror into the generated beam deflects the beam to a given focussing headmirror, and thence to the focussing means.

The angled mirrors selectively interposable into the primary beam may themselves be movable in the lengthwise direction of the beam. The angled mirror on the focussing head may itself be a focussing mirror (and thus constitute, or be part of, the focussing means) especially at higher laser powers. A typical operational sequence might be (i) laser trimming of the initial plate (ii) laser butt-welding of initial plate units to a panel (iii) laser "skid" welding, using the same "interceptor-means" technique, to fit reinforcement bars to the panel, and (iv) the same laser skid-welding technique to attach the large spacing girders across the bars and panel.

Optionally, the "through-welding" technique of our copending Application based on British Application 8310630 could also be utilised, e.g. to fit reinforcing bars to the underside of a panel or to fit a panel over the assembled unit of stages (i) to (iv).

The invention will be further described with reference to the accompanying drawings in which:

FIG. 7 shows a cross-section through welds obtained with a different technique of laser welding;

FIG. 8 shows a cross-section through welds obtained with a technique similar to that of FIG. 7;

FIG. 9 shows a welded bottom panel used in ship construction;

FIG. 10 shows a fixed gantry, carrying an assembly for welding, particularly suitable to give welds as shown in FIGS. 4, or FIGS. 7 or 8.

FIG. 12 shows a production line utilising laser-welding techniques in accordance with the invention.

Figure 5:
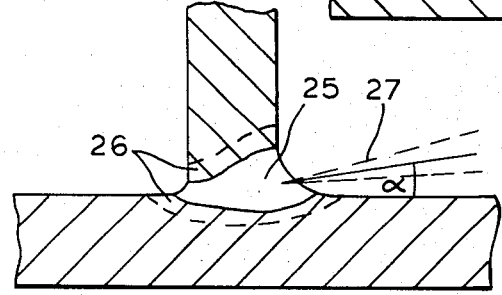
FIG. 5 is a transverse section through a T-weld produced in accordance with the method of the invention.

FIG. 5 shows two plate portions 1 and 2 in theoretically perfect abutment along a line 3. At this line there impinges a laser beam 4, focusing just below the surface. The energy in the beam vaporizes a "key-hole" 5 through the material, with the vapour presssure in the "key-hole" sustaining the molten walls 6. In practice, the vapour is prevented from escaping out of the top of the "key-hole" where it might form a laser-blocking plasma, by a controlled jet of helium (see FIG. 2). As the beam is moved along the joint, the key-hole moves, since the beam melts material ahead of the existing key-hole and material solidifies behind it. A deep penetration weld is formed, usually in one pass.

Figure 1:
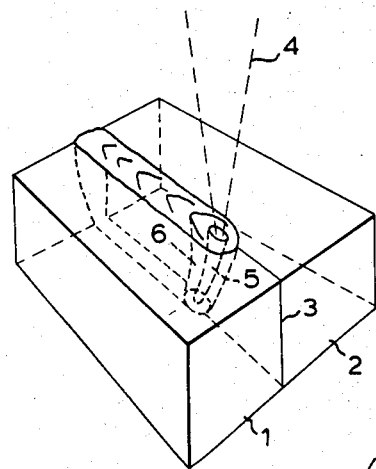
FIG. 1 is a perspective view of theoretical laser welding of two plate portions in a single pass operating from above.
Figure 2:
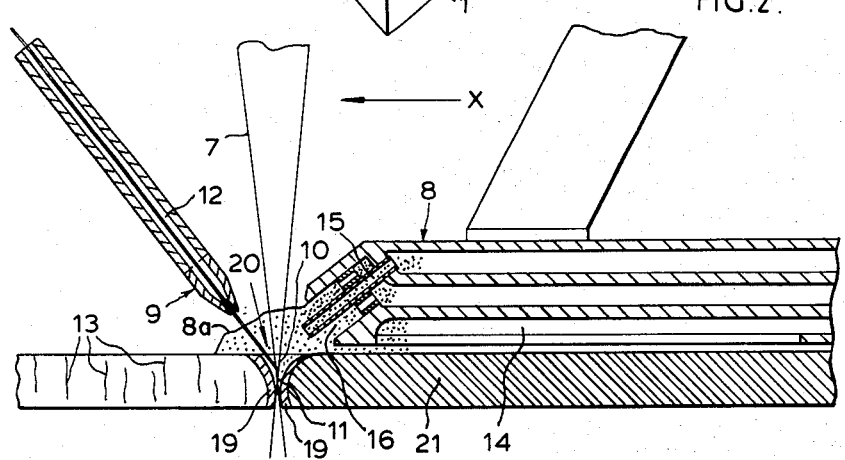
FIG. 2 is a section through one form of equipment according to the invention, taken along the weld line.

FIG. 2 shows a diagrammatic section along the weld line of the essential features of equipment which can be used to carry out the method of the invention.

Laser beam 7 impinges at 10, slightly above its focus 11 on a wire 12 fed continuously through wire feed nozzle 9 by supply rollers driven by an electric motor (not shown). If desired, feed of the wire 12 can be related to the speed of movement of the weld pass, and/or to the measurement of the actual gap between plates, e.g. by a gap sensor ahead of the weld location.

Impingement of the laser beam vapourizes the wire, even where there is a transverse gap between the plates e.g. due to striations 13 on the abutting surfaces which have arisen during earlier cutting. The metal of the wire vapourizes and forms a plasma.

Gas supply hood 8 supplies a shielding gas, typically containing helium, through base channel 14, central duct 15 and surrounding duct 16, in a gas flow configuration such as to confine the plasma. British Pat. No. 1 591 793 describes a typical such hood in more detail. Impingement of the beam of this plasma at 10 absorbs energy which is then transferred to the surrounding metal and continuously forms the molten walls 19 defining the "key-hole" 20 and progressively solidifying as weld 21.

Figure 3:
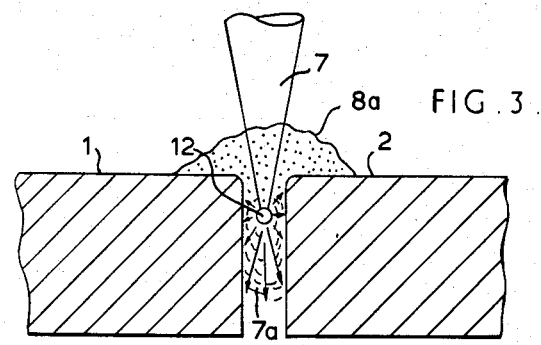
FIG. 3 shows a laser beam impinging on an interceptor wire within a gap between two plates to be welded.

FIG. 3 shows on a larger scale and diagrammatically an idealised view of the technique, in cross-sectional view transverse to that of FIG. 2. Beam 7 impinges on wire 12 to form a plasma 7a which is held in the gap by the gas supply 8a (not shown) and is thus neither blown completely away nor permitted to build up over the top of the gap to prevent the laser beam reaching the interceptor wire with full intensity.

Figure 3A:
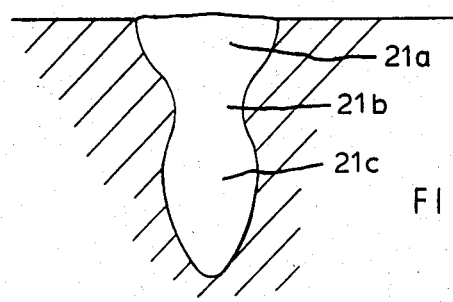
FIG. 3a shows a typical weld cross-section thereby produced.

FIG. 3a shows a weld cross-section which is often, although not invariably, produced utilising this technique (depending on the thickness, gap, speed, materials, etc). In such a weld cross-section there can be seen at 21a a rounded 6 "conduction bowl" zone, a somewhat narrow waist zone 21b at the location of the actual focus, and a broader bottom zone 21c where the beam broadens out again but is still intense enough to have melted the weld material.

It has been found in practice that laser welding as described above introduces much less thermal distortion into the workpiece than conventional prior art processes. In the use of the method according to the invention, it has also been found that there are wide tolerances in the key parameters such as the focus position, the filler feed rate, and the joint tracking, i.e. the overall line of the joint.

Figure 4:
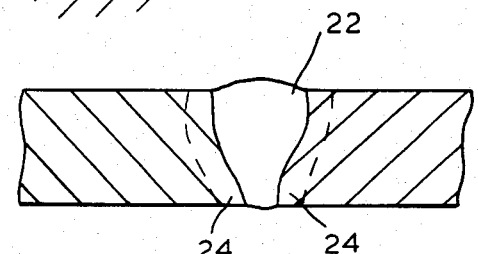
FIG. 4 is a transverse section through a butt-weld produced in accordance with the method of the invention.

FIG. 4 shows a diagram of a transverse section of a typical butt weld according to the invention. It has the characteristic sectional shape 22 of weld metal, broader at the top than at the bottom, and of a slightly bulbous shape in cross-section before tapering off towards the bottom of the weld. To either side of the weld metal is a similarly tapered zone 24 of heat-affected metal, narrower than that encountered using most arc welding processes.

FIG. 5 shows a T-weld also referred to herein as a "skid-weld" according to the invention with similar weld-metal zone 25 and heat-affected zones 26 to those of FIG. 4. The weld of FIG. 5 was formed in a single pass with equipment as shown in FIG. 2 but directed to permit the laser beam 27 to enter the gap between the plates at an angle of between 5° to 15°, as shown.

The invention thus allows a "skid weld" to be formed in joints exhibiting poor fit, by the introduction of a wire for beam impingement, as for the flat butt-joint configuration. The impingement wire may in addition provide filler material, and may also be used to modify the metallurgical composition of the weld.

Although sound connections are usually formed in a single pass from one side, by this skid-welding technique, a second pass from the other side may be utilised.

Figure 6A:
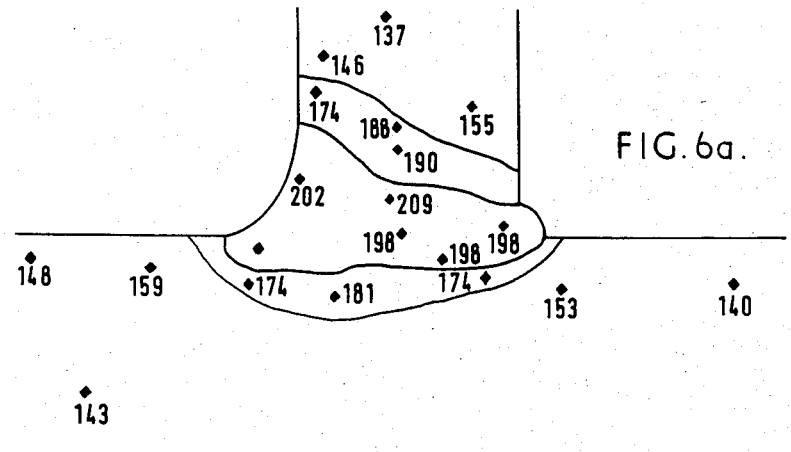
FIGS. 6a, 6b and 6c show hardness readings across three weld-sections, taken by way of example.

FIG. 6a shows an actual example of weld hardness characteristics in a single-pass T-weld between two like plates each 6 mm thick with an air-laser cut edge initially spaced 0.3 mm from the face and with a weld travel speed of 6 mm/sec using an impingement wire of like material. The figures given are Vickers Pyramid hardness indications using a 2.5 kg load.

Figure 6B:
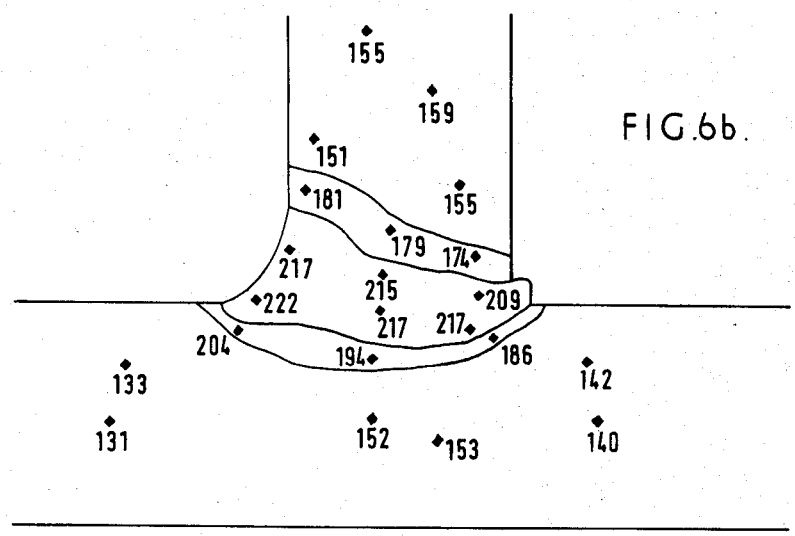
Figure 6C:
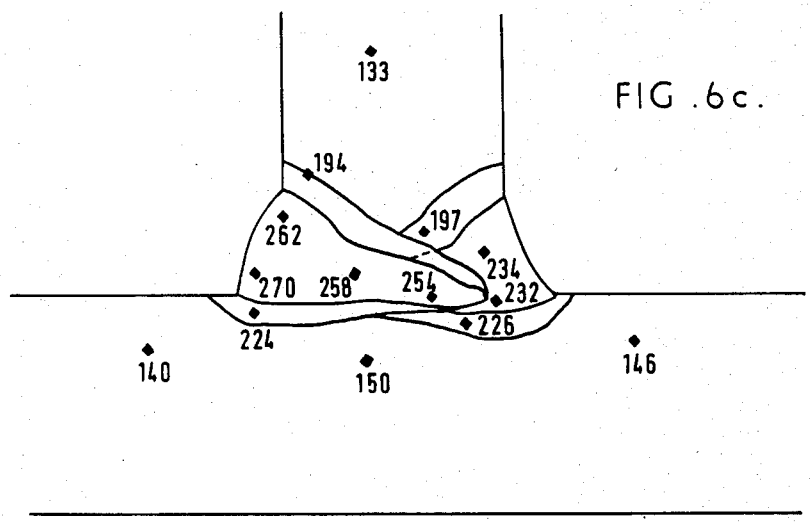

FIG. 6b is similar, but with an 8 mm/sec weld speed.

FIG. 6d shows a dual-sided weld (one pass per side) with respective speeds 12 and 14 mm/sec on a 6 mm oxy-laser cut edge at 0.3 mm spacing.

FIG. 7 shows in cross section a different technique of laser welding, not of itself in accordance with the present invention but described in more detail and claimed in our Application of even date herewith based upon GB Application 83 10630. In this alternative technique welds such as 30 are melted through two layers using a laser beam in the direction of the arrows, and solidify to form a strong joint between the plates 31 and 32, without however the use of an impingement wire or like interceptor means as utilised with the present invention. We have found that this separate invention can be utilised in a production line in association with the welding techniques of the present invention to provide advantages in the total installation and procedures used for the fabricating by welding of large multiweld unit structures.

FIG. 8 is similar to FIG. 7, showing similar laser "throughwels" 33 uniting plates 34 and 35. In this case, however, a "skid-weld" 36 in accordance with the present invention further unites plate 37 at right angles to the plate 35.

FIG. 9 shows a typical composite panel product, in the fabrication of which the welding techniques of the present invention may usefully be applied. It comprises a flat 12 mm plate 38, itself made of steel strips butt-welded as in FIG. 2, which for clarity is shown as an integral plate. On one face of this plate 38 are welded stiffening members 39, eight such being shown, and each being welded along its length to plate 38 by the technique of FIG. 5. Across the stiffening members 39 are welded deep webs 40, contacting both plate 38 and (at one side at least of recesses 40a) the stiffeners 39. Welding is effected by the technique of FIG. 5 at these lines of contact. Deep webs 40 usually possess rolled upper margins 40a for reasons described in more detail below.

In this example, with a panel length of 10 m and breadth of 8 m, the total stiffener joint weld length is 80 m, and the corresponding deep-web joint length is 30 m.

FIG. 10 shows how in practice the device for producing butt welds (FIGS. 2, 3 and 4) can be mounted on a fixed gantry for movement to join adjacent edges of strips of metal 42 and 43 along line 44.

The gantry comprises support legs 41 carrying a hollow cross-piece 45 along which a cross-carriage 46 is movable. At one projecting end of the cross-piece 45 is an angled mirror 47 to intercept an unfocussed laser beam 48 (as described in more detail below) and to reflect it along inside the cross-piece 45. Travelling with the cross-carriage 46 and located within cross-piece 45 is a further angled mirror 49, intercepting at all times the reflected laser beam and reflecting it downwardly within stem 50, through height-following adjustment 51 to further mirrors 52, 53 in swivelling focus head 54 thus yielding a focussed beam at exit 55. A wire feed mechanism 56 is also attached to stem 50 to provide a continuous supply of interceptor wire to the focus of the beam in the gap between the plates 42 and 43.

Figure 10A:
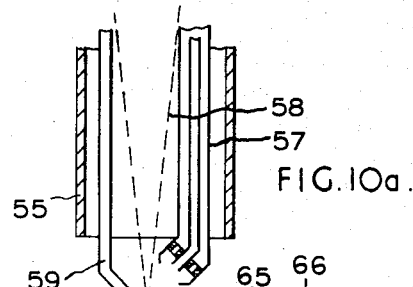
FIG. 10a shows a compact welding head arrangement for such an assembly.

FIG. 10a shows a possible configuration for exit 55, with gas supplying ducting at 57 located to one side of the focussed beam 58 and wire feed guide 59 to the other, so as to give a compact configuration.

Figure 11:
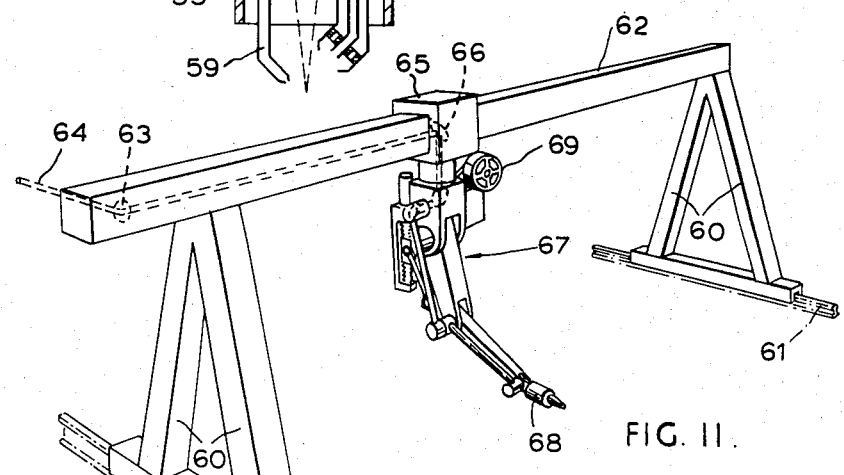
FIG. 11 shows an alternative mobile gantry carrying an assembly for welding particularly suitable to give welds as shown in FIGS. 5, or 6a to 6c.

FIG. 11 shows a welding device according to the invention, for producing welds as shown in FIG. 5 and 6a–6c, mounted on a mobile gantry.

The mobile gantry comprises support legs 60 movable along rails 61 and carrying a crosspiece 62 with angled mirror 63 at one projecting end to intercept an unfocussed laser beam 64 as with beam 48 in FIG. 10. Cross-carriage 65 movable along cross-piece 62 carries an angled mirror 66 within the cross-piece further to deflect the laser beam. A multiaxis robot arm 67 is provided (to take the place of simple height follower 51 and swivelling focus head 54 of FIG. 10) to cope with the additional possibilities of movement, and a flexible laser beam guide is provided within the robot arm to terminate at the focus head 68 which as before is also fed with wire (from 69) and a gas supply. It is clear from FIG. 11 that a high degree of flexibility for vertical or horizontal movements along desired weld lines is provided by this arrangement, i.e. by the gantry movement, cross-carriage movement, and movement about robot arm axes.

The equipment of FIGS. 10 and 11 can be incorporated into improved production facilities for welding of composite panels or like structures. This is shown in FIG. 12. Before considering FIG. 12 in detail is is necessary to appreciate the nature of prior art methods.

A typical known arrangement for construction of the basic panels used in ship construction involves a layout rather as follows:

(a) a preliminary trimming and preparation stage in which the plate received from the supplier is checked as to size and trimmed as necessary. At this stage selected plate edges may also be bevelled to facilitate weld penetration in subsequent butt-welding of two such edges for assembly of the desired number of plate.

(b) welding carried out sequentially in several stages with the plate being conveyed from one stage to the next on a continuous support comprising spaced parallel transverse rollers. A typical sequence of welding stages involves:

(i) butt-welding of several of the trimmed plates to form one larger plate of the desired size. Usually, 3, 4 or 5 such plates are abutted and thermally or arc welded, firstly along the upper edges of the abutting faces, by a welder who controls the weld tool across the plate, and secondly along the underneath edges. This latter step can only be effected by "up-hand" welding, or by turning the half-welded plate over, which needs an expensive crane installation and can cause damage;

(ii) T-welding, or like procedure, carried out to attach stiffening or reinforcement bars of say 100–500 mms depth across the top face of the welded pane, either transversely to or parallel to the initial butt welds. Typically, 10 bars are welded along their whole length (a rolled margin, if any) to the upper face of the welded panel. Typically, moreover, two weld passes are used for each bar, one along either side edge;

(iii) welding, at a 90° orientation to the bars, two or more substantial deep web constructions to the plate and bars. These may reach a height of one metre or more above the plate, and are shaped at a lower edge with cut-away portions generally to accommodate the stiffening bars but also to contact at least part of the bars (e.g. at one side) to permit welding to a unitary structure;

(iv) (optionally where a double-skin panel is desired) placing over the structure as produced by steps (i) and (ii) an inverted panel of the type produced by steps (i), (ii) and (iii) and welding it into place. The major deep webs are thereby sandwiched between, and space apart, two assembled reinforced panels. The necessary welding is then carried out from inside the "crawl-space" thus defined and is an unpleasant and expensive task.

Thus, elaborate crane installations, a plurality of separately equipped weld stations and expensive and dangerous welding techniques are all involved in this typical arrangement. Also, in practice, thermal deformations may arise during welding, needing expensive clamps or straightening equipment as subsidiary features of the equipment.

FIG. 12 shows a production line according to one aspect of the present invention for composite panels fabricated in welding. The example shown comprises five in-line work-stations I–V serviced by a common overhead crane, for simple transfer movement, diagrammatically shown at 70 and a common laser installation 71. The line width is typically suitable for plate up to 12 in maximum dimension.

Station I comprises a magnetic bed 72 to hold a strip of plate (not shown) with one edge over inspection pit 73 and abutting a like strip along a line transverse to the production direction, so as to lie directly underneath a gantry as shown in FIG. 10. Laser beam 48 of FIG. 10 reaches the gantry as shown, and the movement of cross-carriage 46 carries a welding head along the abutting line to focus the beam and effect welding as shown in FIGS. 2, 3 and 4. A number of strips can thus be built into a plate 38 (see FIG. 9). This station I can if necessary comprise rollers for movement in the line directions as can other stations if desired.

Station II can itself be turntable-mounted at 74. It comprises a conventional rail-mounted transverse arc-carrying arm 75 for initial tackwelding positioning of stiffening members 39 across the butt-welded plate. The turn-table allows such stiffening members to lie across or parallel to the initial butt-welds (see FIG. 9).

Station III comprises a movable gantry as shown in FIG. 11. Laser beam 64 is deflected along cross-piece 62 to cross-carriage 65 and thence down the robot arm in its laser beam guide to focus head 68. By this station stiffeners 39 (already immobilised by tackwelding) can be welded, in the manner shown in FIG. 5, to the plate 38, movement of the gantry, cross-carriage and robot arm following the necessary weld lines.

Station IV resembles station III, but the gantry, cross-carriage, and robot arm are differently moved so as to weld the deep webs 40, supplied by crane 70, to the previous assembly.

Station V is a conventional inspection, repair and loadout station.

The nature of the laser installation 71 will be generally self-explanatory. Conveniently, two 10 kw lasers 76, 77 are used with a beam expander 78 whereby the beams may be combined before outward deflection to the beam paths 48, 64 and interception by mirrors 47, 63 respectively. Of course, the various mirrors are controllable to be selectively positionable in or movable from the unfocussed beam path.

The existence of the heavy-duty laser installation for welding procedures as shown, in accordance with the invention, on the line of FIG. 12 also permits further equipment or stations to be incorporated. For example, the laser path 48 could be extended onwards in the direction of arrow A, and the beam suitably reflected and focussed to operate a preliminary cutting or trimming stage (not shown) on steel strips as received from suppliers. Laser cutting is a known expedient, and a beam powerful enough for welding purposes will be fully adequate for cutting.

Figure 13:
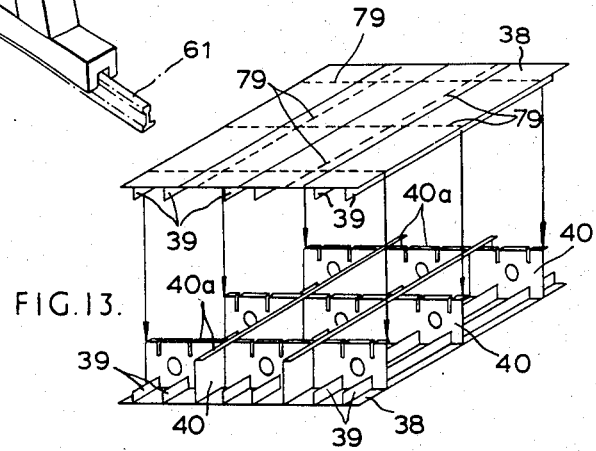
FIG. 13 shows diagrammatically how a double-skinned panel can be welded.

FIG. 13 shows diagrammatically the operation effected in a further fabrication stage notionally interposed between Stations IV and V. The composite panel of FIG. 9 can itself be welded (using the rolled margins 40*a* of the deep webs) to another plate 38, 39 to give a double-skin panel which is a standard unit of ship contruction. Using a gantry as shown in FIG. 11, (or possibly a gantry as shown in FIG. 10, with a turntable) and an additional laser-beam pathway to feed the focus head, "throughwelds" as shown in FIGS. 7 and 8, in themselves claimed in our copending Application referred to above, can be provided along the dotted lines 79 by a simple "downhand" welding technique. Thus this standard unit can be made on one production line without expensive or dangerous overhand welding or use of welding equipment in confined and inconvenient spaces.

I claim:

1. A method for the welding together of portions of metal plate comprising the steps of: locating the portions to be welded in as close contact as their surfaces permit; causing a focussed high-energy laser beam to travel along the said line of best contact, said laser beam having power in the range of 5 to 25 kW; continuously feeding a separate compatible beam-interceptor wire so as to locate it generally at the beam focus; and directing a supply of gas towards the beam focus to at least partially confine a plasma at least partially formed by impingement of the focussed beam upon the interceptor wire.

2. A method as claimed in claim 1 in which the weld line is that of a butt weld between adjacent generally contiguous plate edges.

3. A method as claimed in claim 1 in which the weld line is that of a T-weld between a plate and the surface of a contiquous plate, and in which the axis of the focussed beam lies at an angle of less than 20° to the said contiguous plate surface.

4. A method as claimed in claim 3 in which the said angle is from 5° to 15°.

5. A method as claimed in claim 1, 2 or 3 in which the metal plate is steel plate from 3 to 25 mm in thickness.

6. A weld head comprising means for focussing a high-intensity laser beam, said laser beam having power in the range of 5 to 25 kW; means for feeding to said focus a beam-interceptor wire; and gas supply means directed towards said focus to localize and contain the energy-transferring plasma generated by impingement of the focussed beam on the interceptor material.

7. An arrangement of work stations for use in the assembly by welding of metal plates comprising: a high-intensity laser beam generator generating an unfocussed laser beam, said laser beam having power in the range of 5 to 25 kW; reflective means defining an optical path of said unfocussed beam; at least two workstations at separate locations within a workflow sequence, each said workstation comprising a laser beam focussing head; and reflective means at each said workstation selectively positionable into said optical path to reflect an unfocussed beam to said focussing head; in which at least one workstation comprises in association with the said focussing head (a) means for feeding to said focus a beam-interceptor wire and (b) gas-supply means directed towards said focus to localise and contain the energy-transferring plasma generated by the inpingement of the focussed beam on the interceptor wire.

8. An arrangement as claimed in claim 7 in which up to five of said workstations are welding stations.

9. An arrangement as claimed in claim 7 or 8 in which the reflective means are angled mirrors themselves movable in the lengthwise direction of the unfocussed beam.

10. A method for the welding together of portions of metal plate comprising the steps of: locating the portions to be welded in as close contact as their surfaces permit; causing a focussed high-energy laser beam to travel along the said line of best contact; continuously feeding a separate beam-interceptor wire so as to locate it generally at the beam focus, said interceptor wire being of a material compatible with the material of the plate; and directing a supply of gas towards the beam focus to at least partially confine a plasma at least partially formed by impingement of the focussed beam upon the interceptor wire.

* * * * *